(12) United States Patent
Kanno et al.

(10) Patent No.: US 7,575,109 B2
(45) Date of Patent: Aug. 18, 2009

(54) ROTARY DAMPER AND METHOD FOR MANUFACTURING ROTARY DAMPER

(75) Inventors: Hidenori Kanno, Tokyo (JP); Ryota Shimura, Tokyo (JP); Masanori Itagaki, Tokyo (JP); Yoshihiko Nagashima, Tokyo (JP)

(73) Assignee: Kabushiki Kaisha Somic Ishikawa, Sumida-Ku, Tokyo (JP)

( * ) Notice: Subject to any disclaimer, the term of this patent is extended or adjusted under 35 U.S.C. 154(b) by 317 days.

(21) Appl. No.: 10/568,295

(22) PCT Filed: Jun. 8, 2004

(86) PCT No.: PCT/JP2004/007958

§ 371 (c)(1),
(2), (4) Date: Aug. 3, 2006

(87) PCT Pub. No.: WO2005/031187

PCT Pub. Date: Apr. 7, 2005

(65) Prior Publication Data

US 2007/0193840 A1      Aug. 23, 2007

(30) Foreign Application Priority Data

Sep. 25, 2003    (JP) .............................. 2003-334178

(51) Int. Cl.
*F16D 57/02*    (2006.01)
(52) U.S. Cl. ...................................... 188/296; 188/290

(58) Field of Classification Search ................. 188/290, 188/296; 16/85, 54, 82
See application file for complete search history.

(56) References Cited

U.S. PATENT DOCUMENTS

| 4,697,781 | A  | * | 10/1987 | Hamano et al. | ............. | 248/559 |
| 4,768,630 | A  | * | 9/1988  | Aubry et al.  | ................. | 188/290 |
| 5,522,485 | A  | * | 6/1996  | Takahashi et al. | ........... | 188/290 |
| 6,082,507 | A  | * | 7/2000  | Forster       | ....................... | 188/296 |
| 6,224,098 | B1 | * | 5/2001  | Katsuda et al. | ............. | 280/741 |
| 7,066,308 | B2 | * | 6/2006  | Kanno et al.  | ................. | 188/290 |
| 7,353,923 | B2 | * | 4/2008  | Seto et al.   | ................... | 188/290 |

FOREIGN PATENT DOCUMENTS

| JP | 8014301  | 1/1996 |
| JP | 10141420 | 5/1998 |

* cited by examiner

*Primary Examiner*—Melanie Torres
(74) *Attorney, Agent, or Firm*—Cozen O'Connor

(57) ABSTRACT

Described is a rotary damper comprising a partition wall to partition space formed between a rotor and a housing to house said rotor and to form a fluid chamber to be fluid-filled; and a vane to be disposed in said fluid chamber; and a plug to close an opening of said housing; wherein said plug has a flange to be used for mounting which protrudes from an outer circumferential surface of said plug and a stepped portion to enable part of a roller caulking an edge of said opening of said housing to revolve and travel along a peripheral edge of said housing so that said plug having said flange is coupled to said housing by caulking an edge of said opening of said housing.

2 Claims, 7 Drawing Sheets

(a)

(b)

(a)

(b)

ROTARY DAMPER AND METHOD FOR MANUFACTURING ROTARY DAMPER

FIELD OF THE INVENTION

The present invention relates to a rotary damper comprising: a partition wall that partitions a space formed between a rotor and a housing for housing the rotor and forms a fluid chamber filled with fluid; and a vane provided in the fluid chamber, and a method for manufacturing the rotary damper.

BACKGROUND OF THE INVENTION

A rotary damper disclosed in, for example, Japanese Patent Application Laid-Open No. 2002-81482 (Patent reference 1) is known as a rotary damper comprising: a partition wall that partitions a space formed between a rotor and a housing for housing the rotor and forms a fluid chamber filled with fluid; and a vane provided in the fluid chamber.

A rotary damper of this kind can slow down the rotational motion of an object to be controlled by resistance caused when fluid pressed by a vane swinging in a fluid chamber moves through a small gap or the like between the vane and a housing.

However, in the conventional rotary damper, the partition wall is formed integrally with the housing but a casting method such as zinc die casting or the like is used as forming means. For this reason, the conventional rotary damper presents the problem of increasing manufacturing cost and has the defect of increasing the weight of a product.

Moreover, the shape and size of a flange used when the rotary damper is mounted is designed in accordance with an object having the rotary damper mounted thereon. However, because the flange is provided for the housing, the die of the whole housing including the flange needs to be manufactured every time design is changed.

Furthermore, in a rotary damper having a plug bonded thereto by caulking the edge of the opening of the housing formed by zinc die casting, there is presented a problem that a caulked portion is easily deformed by creep caused by internal pressure.

[Patent Reference 1] Japanese Patent Application Laid-Open No. 2002-81482

BRIEF DESCRIPTION OF THE INVENTION

The present invention has been made in view of the above-mentioned circumstances. The object of the present invention is to reduce the weight of a product and to reduce the manufacturing cost, to make design changes in the shape and size of a flange used for mounting a rotary damper at low cost and with ease, and to enhance the bonding strength of a plug to a housing to prevent the degradation of characteristics and breakage.

To achieve the above-mentioned object, the present invention as claimed in claim 1 provides a rotary damper comprising: a partition wall that partitions a space formed between a rotor and a housing for housing the rotor to thereby form a fluid chamber filled with fluid; and a vane provided in the fluid chamber, and characterized in that the housing and the partition wall are integrally formed by press working.

The present invention provides the rotary damper as characterized in that a plug for closing an opening of the housing has a flange for mounting.

The present invention provides the rotary damper characterized in that the plug is formed by press working.

The present invention provides the rotary damper characterized in that the plug is bonded to the housing by caulking the edge of the opening of the housing.

The present invention provides the rotary damper characterized in that the plug is provided with a stepped portion capable of causing a portion of a roller for caulking the edge of the opening of the housing to turn along the outside peripheral edge of the housing.

The present invention is a method for manufacturing a rotary damper including: a partition wall that partitions a space formed between a rotor and a housing for housing the rotor to thereby form a fluid chamber filled with fluid; and a vane provided in the fluid chamber, and characterized by comprising the step of integrally forming the housing and the partition wall by press working.

The present invention provides the method for manufacturing a rotary damper characterized by comprising the step of forming a plug, which closes the opening of the housing and has a flange for mounting, by press working.

The present invention provides the method for manufacturing a rotary damper characterized by comprising the step of caulking the edge of the opening of the housing to bond to the plug to the housing.

According to the present invention, the housing and the partition wall are integrally formed by press working. Hence, as compared with the case of forming them by a conventional casting method such as zinc die casting, it is possible to reduce the weight of a product and to reduce manufacturing cost by a large amount.

According to the present invention, further, the plug for closing the opening of the housing has a flange for mounting. For this reason, even when design changes in the shape and size of the flange is made, it is not necessary to manufacture a die for forming the housing but it is necessary only to prepare a die for forming a plug of simple construction as compared with the housing. Therefore, it is possible to make design changes in the shape and size of the flange at low cost and with ease.

According to the present invention, still further, the plug having a flange for mounting is formed by press working. For this reason, it is possible to further reduce the manufacturing cost of the whole of the rotary damper.

According to the present invention, still further, the plug is bonded to the housing by caulking the edge of the opening of the housing. For this reason, it is possible to enhance the bonding strength of the plug to the housing as compared with a case where a plug is bonded to a housing by caulking the edge of the opening of the housing formed by zinc die casting and hence to prevent the degradation of characteristics and breakage.

According to the present invention, still further, the plug is provided with a stepped portion capable of causing a portion of a roller for caulking the edge of the opening of the housing to turn along the outside peripheral edge of the housing. For this reason, it is possible to put the edge of the opening of the housing pressed and bent by the roller into closer contact with the plug and hence to further enhance the bonding strength of the plug to the housing.

According to the present invention, the method for manufacturing a rotary damper includes the step of integrally forming the housing and the partition wall by press working. For this reason, as compared with a method for integrally forming by a conventional casting method such as zinc die casting, it is possible to reduce the weight of a product and to reduce manufacturing cost by a large amount.

According to the present invention, the method for manufacturing a rotary damper includes the step of forming a plug, which closes the opening of the housing and has a flange for mounting, by press working. For this reason, even when the design changes in the shape and size of the flange is made, it is not necessary to manufacture a die for forming the housing but it is necessary only to prepare a die for forming a plug of simple construction as compared with the housing. Therefore, it is possible to make design changes in the shape and size of the flange at low cost and with ease. Furthermore, it is possible to further reduce the manufacturing cost of the whole of the rotary damper by forming the plug by press working.

According to the present invention, the method for manufacturing a rotary damper includes the step of caulking the edge of the opening of the housing to bond the plug to the housing. For this reason, it is possible to manufacture a rotary damper that is enhanced in the bonding strength of the plug to the housing, as compared with a case where a plug is bonded to a housing by caulking the edge of the opening of the housing formed by zinc die casting, and hence can prevent the degradation of characteristics and breakage.

BRIEF DESCRIPTION OF THE DRAWINGS

FIG. 8($a$) is a plan view and FIG. 8($b$) is a cross-sectional view along a line F-F in FIG. 8($a$).

FIG. 9($a$) is a plan view and FIG. 9($b$) is a cross-sectional view along a line G-G in FIG. 9($a$).

FIG. 10($a$) is a plan view and FIG. 10($b$) is a cross-sectional view along a line H-H in FIG. 10($a$).

FIG. 11($a$) is a plan view and FIG. 11($b$) is a cross-sectional view along a line I-I in FIG. 11($a$).

FIG. 12($a$) is a plan view and FIG. 12($b$) is a cross-sectional view along a line J-J in FIG. 12($a$).

DESCRIPTION OF REFERENCE CHARACTERS

Figure 1:
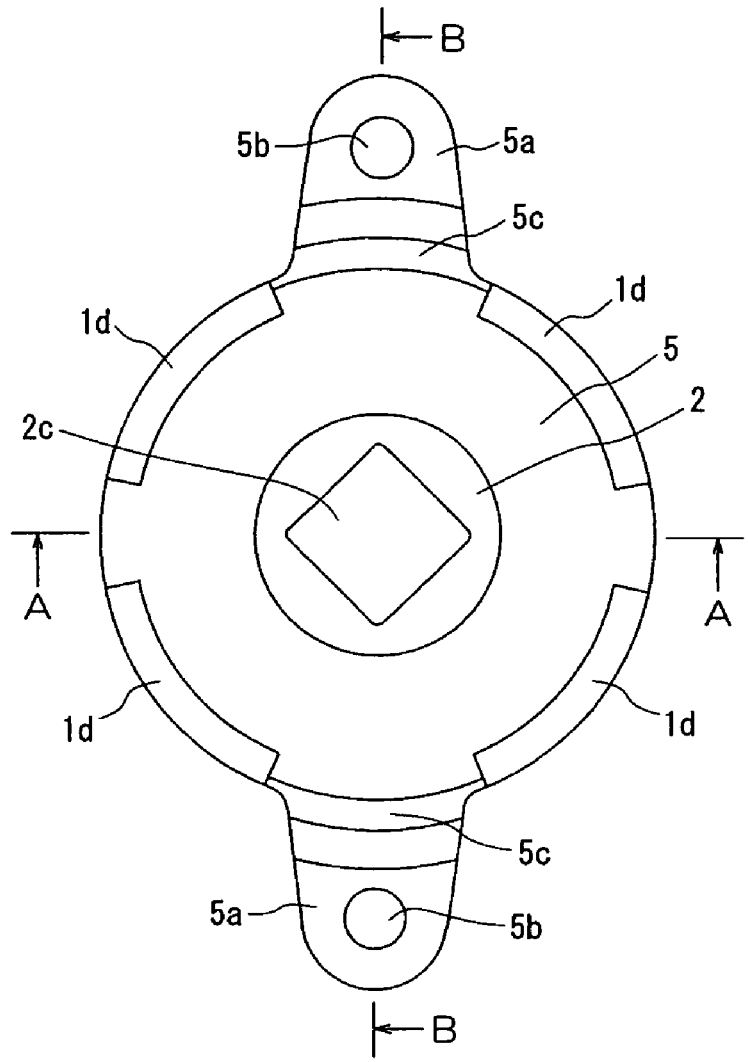
FIG. 1 is a plan view showing a rotary damper according to one embodiment of the present invention.

1: Housing
1$a$: External wall
1$b$: Internal wall
1$c$: Bottom wall
1$d$: Edge
2: Rotor
2$a$: Large-diameter portion
2$b$: Small-diameter portion
2$c$: Hole
3: Partition wall
4: Vane
5: Plug
5$a$: Flange
5$b$, 5$d$: Hole
5$c$: Stepped portion
6$a$, 6$b$: O ring
7$a$: First chamber
7$b$: Second chamber
8: Roller

DETAILED DESCRIPTION OF THE INVENTION

Hereinafter, the mode of carrying out the present invention will be described according to the embodiment. However, it is not intended to limit the present invention by this embodiment.

Embodiment 1

A rotary damper according to the present embodiment, as shown in FIG. 1 to FIG. 4, is constructed of a housing 1, a rotor 2, partition walls 3, vanes 4, and a plug 5.

Figure 2:
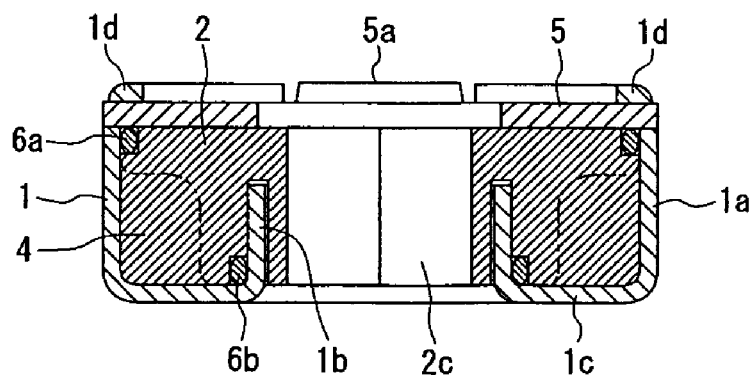
FIG. 2 is a cross-sectional view along a line A-A in FIG. 1.

The housing 1, as shown in FIG. 2, is constructed of an external wall 1$a$ forming the outside peripheral surface of the housing 1 and having nearly circular cross section, a bottom wall 1$c$ closing one end of the housing 1, and an internal wall 1$b$ having a smaller diameter than the external wall 1$a$ and having nearly circular cross section. This internal wall 1$b$ plays the role of supporting the rotor 2 to be described later. Then, the forming of the internal wall 1$b$ has the advantage of producing a space where a sealing member for preventing the leak of fluid is arranged. In FIG. 2, reference characters 6$a$, 6$b$ designate O rings as the sealing members.

Figure 3:
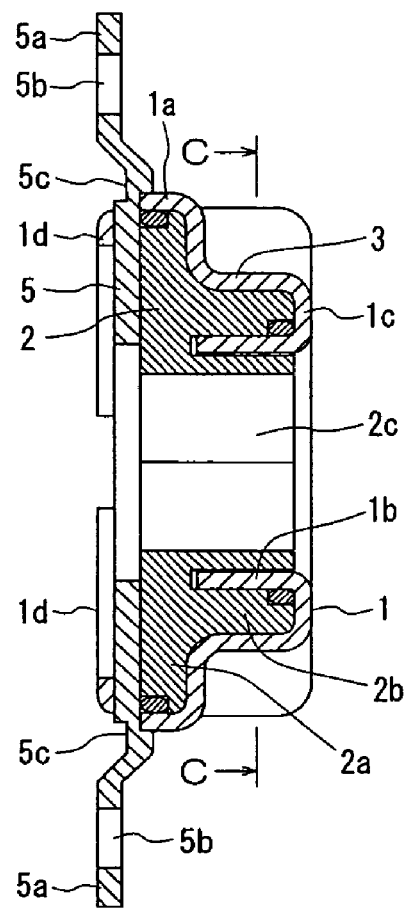
FIG. 3 is a cross-sectional view along a line B-B in FIG. 1.

The rotor 2, as shown in FIG. 3, is constructed of a large-diameter portion 2$a$ having an outside diameter a little smaller than the inside diameter of the external wall 1$a$ of the housing 1, a small-diameter portion 2$b$ having an outside diameter smaller than the large-diameter portion 2$a$, and a hole 2$c$ passing through the rotor 2 along an axis and having nearly square cross section. This rotor 2 is rotatably housed in the housing 1 in a state where the internal wall 1$b$ of the housing 1 is inserted into a groove formed in the end surface of the small-diameter portion 2$b$.

Figure 4:
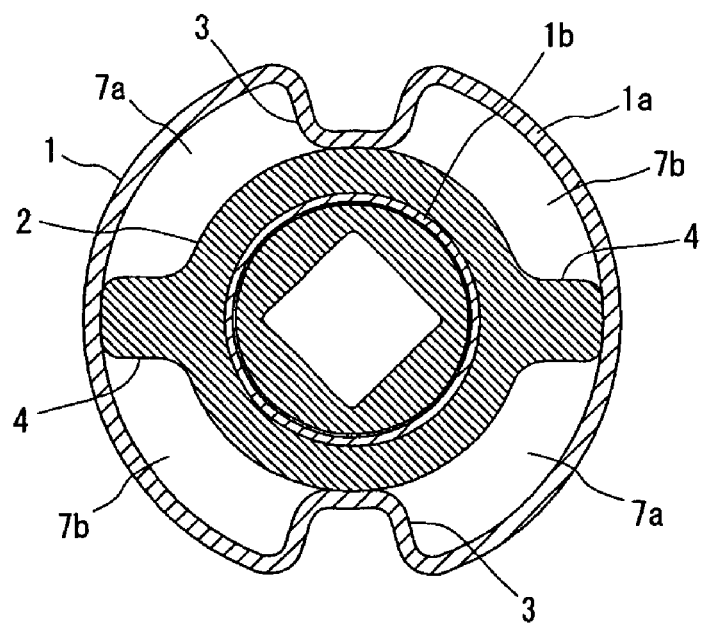
FIG. 4 is a cross-sectional view along a line C-C in FIG. 3.
Figure 5:
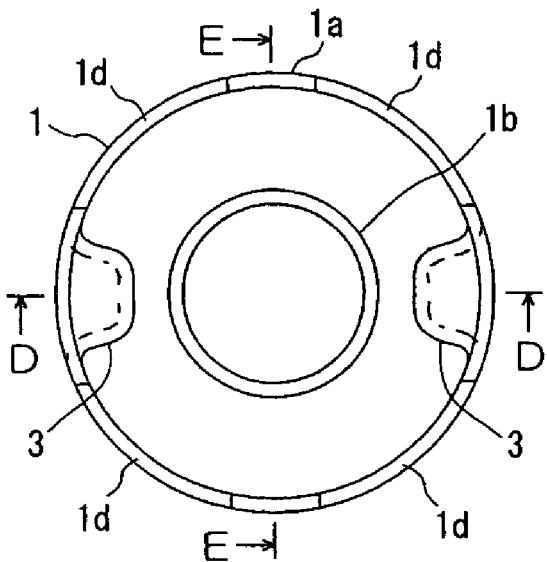
FIG. 5 is a plan view of a housing.
Figure 6:
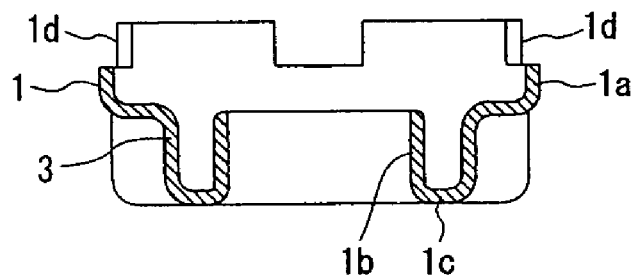
FIG. 6 is a cross-sectional view along a line D-D in FIG. 5.
Figure 7:
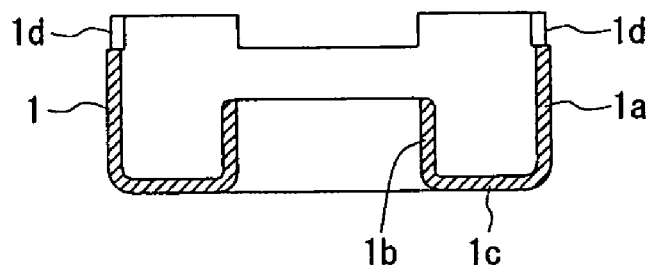
FIG. 7 is a cross-sectional view along a line E-E in FIG. 5.

As shown in FIG. 4 to FIG. 6, the partition walls 3 are formed integrally with the housing 1 in such a way as to protrude from the inside peripheral surface of the external wall 1$a$ of the housing 1 toward the axis and press working is employed as means for forming the partition walls 3 in this embodiment. That is, the housing 1, with which the partition walls 3 are formed integrally, is formed by working a steel plate as a raw material by the use of a press machine. With this, as compared with a housing formed by a casting method such as zinc die casting, the weight of a product can be made extremely light and the manufacturing cost of the product can be reduced by a large amount. The housing 1 can be manufactured by the following steps as the manufacturing method.

Figure 8:
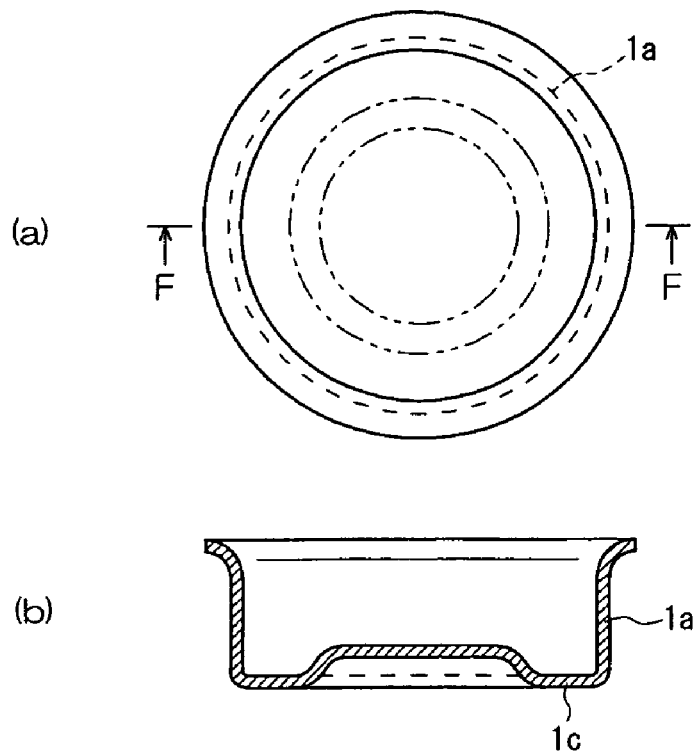
FIG. 8 is views showing a first step at the time of forming a housing by press working.
Figure 9:
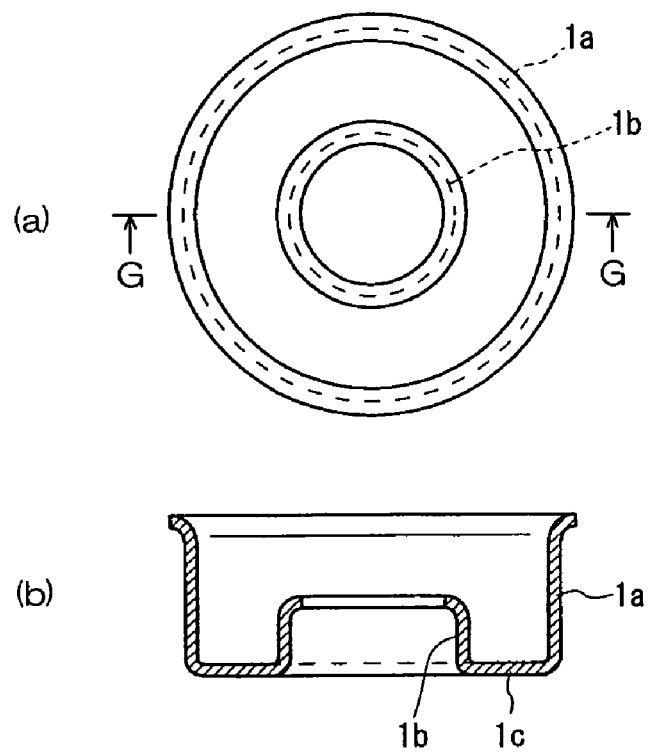
FIG. 9 is views showing a second step at the time of forming a housing by press working.
Figure 10:
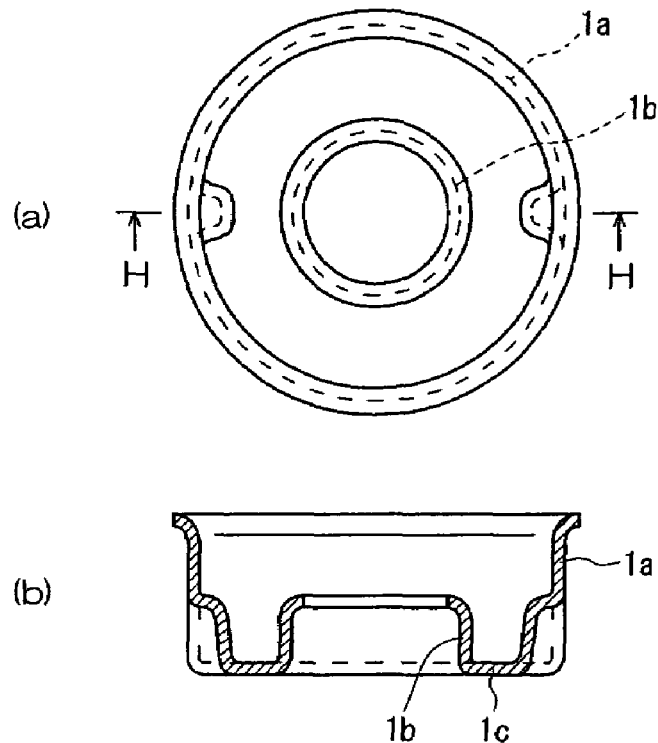
FIG. 10 is views showing a third step at the time of forming a housing by press working.
Figure 11:
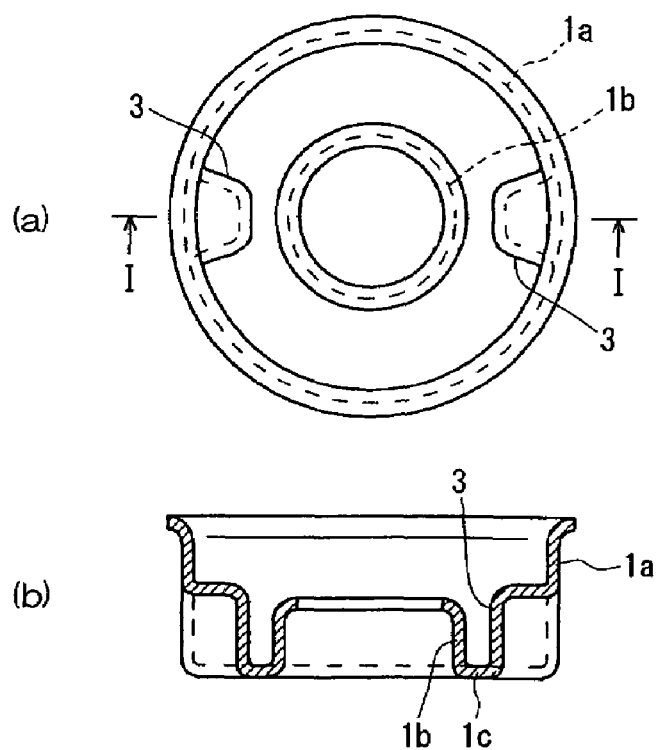
FIG. 11 is views showing a fourth step at the time of forming a housing by press working.
Figure 12:
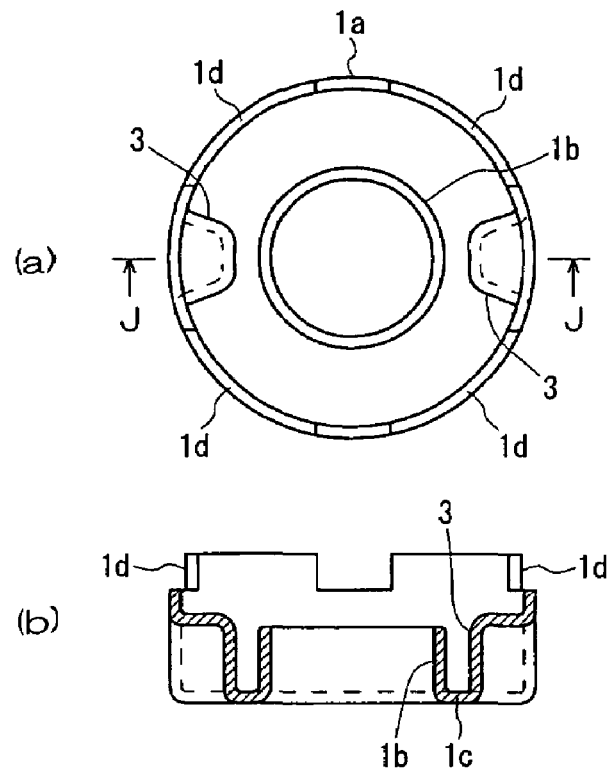
FIG. 12 is views showing a final step at the time of forming a housing by press working.
Figure 13:
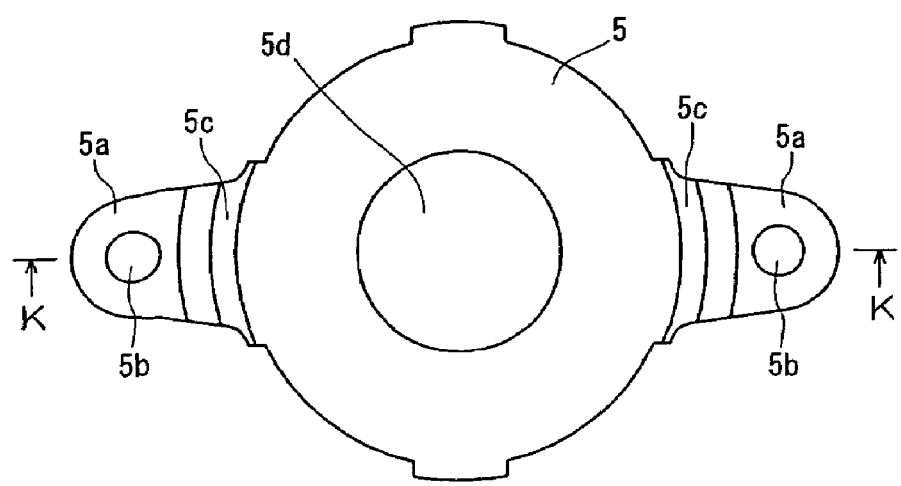
FIG. 13 is a plan view of a plug.
Figure 14:
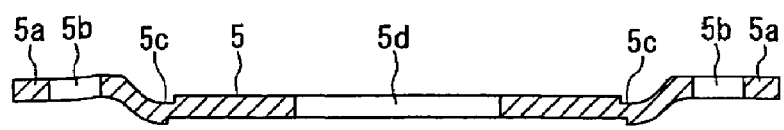
FIG. 14 is a cross-sectional view along a line K-K in FIG. 13.

First, in the first step, as shown in FIG. 8, the external wall 1$a$ and the bottom wall 1$c$ of the housing 1 are formed of a steel plate and, at the same time, a portion forming the internal wall 1$b$ of the housing 1 is formed in such a way as to be raised slightly from the bottom wall 1$c$. Next, in the second step, as shown in FIG. 9, potions forming the internal walls 1$b$ of the housing 1 are raised completely from the bottom wall 1$c$ and the top of the raised portion is punched out to form the internal wall 1$b$. Next, in the third step, as shown in FIG. 10, portions forming the partition walls 3 are formed in such a way as to protrude a little from the inside peripheral surface of the external wall 1a of the housing 1. Next, in the fourth step, as shown in FIG. 11, the portions forming the partition walls 3 are protruded completely from the inside peripheral surface of the external wall 1a of the housing 1 to form the partition walls 3. Then, in the final step, as shown in FIG. 12, unnecessary portions at the end portion of the internal wall 1b of the housing 1 and at the end portion of the external wall 1a forming the opening of the housing 1 are removed to thereby complete the housing 1 with which the partition walls 3 are formed integrally. Here, the edge 1d of the opening of the completed housing 1 is caulked as will be described later, thereby being formed into a specified shape such that a plug 5 to be described later can be firmly bonded to the housing 1.

As described above, the partition walls 3 formed integrally with the housing 1, as shown in FIG. 4, are formed in such a way that their tip end surfaces are put into sliding contact with the outside peripheral surface of the small-diameter portion 2b of the rotor 2, whereby the space formed between the rotor 2 and the housing 1 is partitioned by these partition walls 3 to form a fluid chamber filled with fluid such as silicon oil in the housing 1.

The vanes 4 are formed integrally with the rotor 2 in such a way as to protrude from the outside peripheral surface of the small-diameter portion 2b of the rotor 2 toward the inside peripheral surface of the housing 1. These vanes 4 are arranged in the fluid chamber and their tip surfaces are put into sliding contact with the inside peripheral surface of the housing 1. With this, the fluid chamber is divided into two chambers (hereinafter referred to as "first chamber" and "second chamber") 7a, 7b. Then, fluid flows between the first chamber 7a and the second chamber 7b through gaps or the like formed between the vanes 4 and the housing 1.

After the housing 1 has the rotor 2 and the vanes 4 arranged therein and is filled with fluid, the opening of the housing 1 is closed by the plug 5. As for this plug 5, it is preferable that the plug 5 is provided with a flange 5a for mounting a rotary damper on an object having the rotary damper mounted thereon, as shown in FIG. 1, FIG. 3, FIG. 13, and FIG. 14. By providing the plug 5 with the flange 5a for mounting, even if design changes in the shape and size of the flange 5a is made, it is not necessary to manufacture a die for forming a housing like a conventional method, but it is essential only that a die for forming the plug 5 of simple construction as compared with the housing is prepared. Therefore, it is possible to make design changes in the shape and size of the flange 5a at low cost and with ease.

Moreover, it is preferable that the plug 5 having the flange 5a for mounting is formed by press-working a steel plate as a raw material. With this, the manufacturing cost of the whole of the rotary damper can be further reduced. Furthermore, preferably, the plug 5 is provided with stepped portions 5c capable of causing the portion of a roller 8 for caulking the edge 1d of the opening of the housing 1 to turn along the outside peripheral edge of the housing 1.

Preferably, the plug 5 formed in the above-mentioned manner is bonded to the housing 1 by caulking the edge 1d of the opening of the housing 1. This is because the plug 5 bonded to the housing 1 by caulking the edge 1d of the opening of the housing 1 formed by press-working the steel plate can be improved in the bonding strength of the plug 5 to the housing 1, as compared with a plug bonded to a housing by caulking the edge of the opening of the housing formed by conventional zinc die casting method, and hence can prevent the degradation of characteristics and breakage caused by the deformation of a caulked portion by internal pressure.

Figure 15:
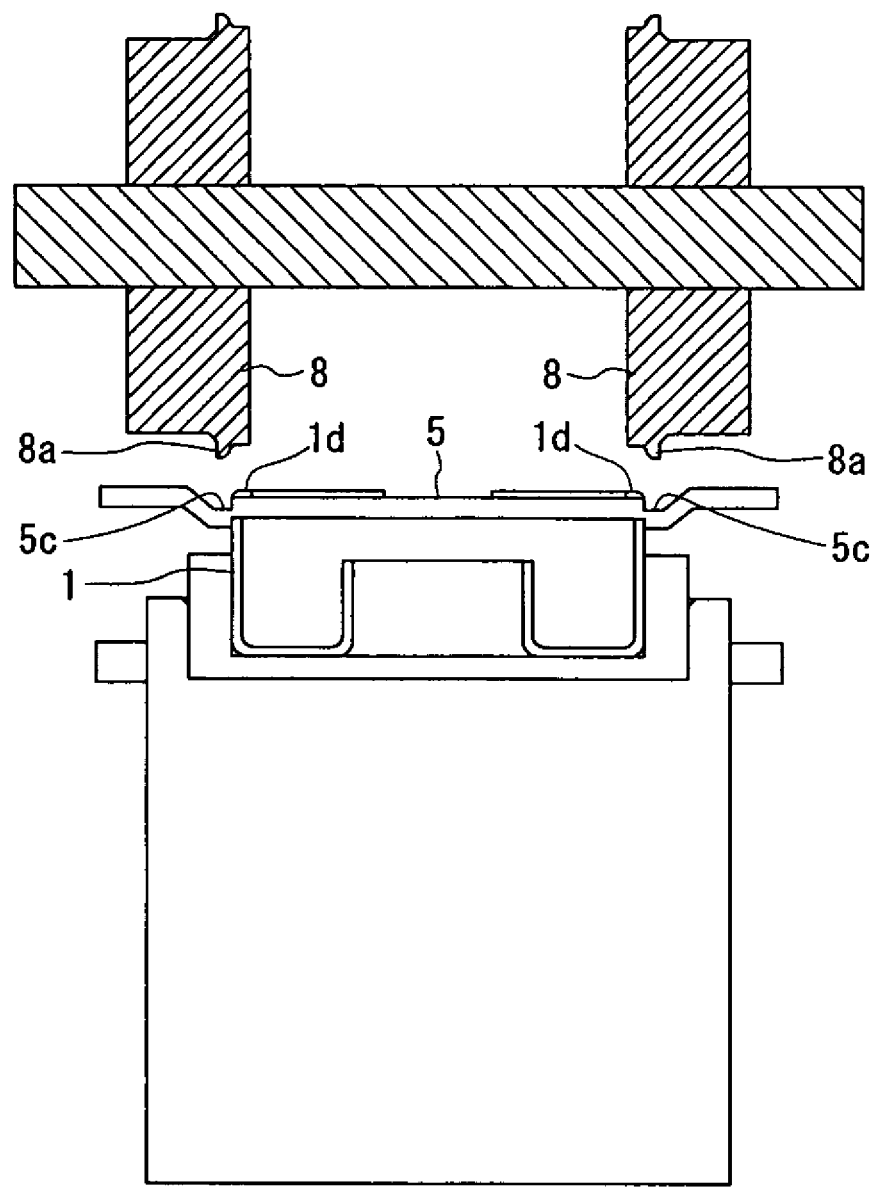
FIG. 15 is a diagram showing a method for mounting a plug in a housing.

Moreover, it is preferable that the plug 5 is bonded to the housing 1, for example, as shown in FIG. 15, by the use of a caulking unit provided with rollers 8 moving down while turning and capable of caulking the edge 1d of the opening of the housing 1. This is because of the following reason: each of the rollers 8 of this caulking unit has a portion, which abuts against the edge 1d of the opening of the housing 1 to press and bend the edge 1d, and a portion 8a, which protrudes outward from the portion and turns along the outside peripheral edge of the housing 1 at the time of caulking, formed on its outside periphery, whereas because the plug 5 has the above-mentioned stepped portions 5c formed, the edge 1d of the opening of the housing 1 pressed and bent by the roller 8 can be put into closer contact with the plug 5 to further improve the bonding strength of the plug 5 to the housing 1.

The rotary damper constructed in the above-mentioned manner is used in the following manner. That is, first, fixing hardware such as screw and bolt are passed through holes 5b formed in the flanges 5a and the plug 5 having the flange 5a is fixed by the fixing hardware to a specified object having a rotary damper mounted thereon. Because the plug 5 is bonded to the housing 1, when the plug 5 is fixed to the object having a rotary damper mounted thereon, the housing 1 is also fixed thereto. Here, the housing 1 is bonded to the plug 5 in such a manner that it cannot turn.

A hole 5d through which the shaft (not shown) of an object to be controlled is passed is formed nearly in the center of the plug 5 and the shaft of the object to be controlled is passed through a hole 2c formed in the rotor 2 through the hole 5d and is coupled to the rotor 2.

Then, when the shaft coupled to the rotor 2 rotates with the rotation of the object to be controlled, the rotor 2 rotates in the housing 1 and the vanes 4 swing in the fluid chamber with the rotation of the rotor 2. For example, in FIG. 4, when the vanes 4 swing clockwise, fluid in the first chamber 7a is compressed between the vanes 4 and the partition walls 3 and the fluid in the first chamber 7a moves into the second chamber 7b through a small gap or the like formed between the vanes 4 and the housing 1. Then, the rotational force of the rotor 2 is damped by the resistance of the fluid caused at this time to slow down the rotational motion of the object that is coupled to the rotor 2 via the shaft and is to be controlled.

In this regard, the rotary damper according to the present embodiment employs the construction of causing the fluid to produce resistance to exert a damping force even when the vanes 4 swing either clockwise or counterclockwise. However, it is also possible to employ a construction in which each of the vanes 4 has a fluid passage formed therein and has a check valve provided in the fluid passage and exerts a damping force only when the vane 4 swing in one direction. Then, in the rotary damper according to the present embodiment, two partition walls 3 formed integrally with the housing 1 are provided in such a way as to be opposed to each other across the rotor 2, but it is also recommendable to provide the rotary damper with one partition wall 3.

According to the present invention, it is possible to reduce the weight of a product and to reduce manufacturing cost, to make design changes in the shape and size of a flange for mounting at low cast and with ease, and to enhance the bonding strength of the plug to the housing to prevent the degradation of characteristics and breakage.

What is claimed is:
1. A rotary damper comprising:
a partition wall to partition space formed between a rotor and a housing to house said rotor and to form a fluid chamber to be fluid-filled; and
a vane to be disposed in said fluid chamber; and
a plug to close an opening of said housing;

wherein said plug has a flange to be used for mounting which protrudes from an outer circumferential surface of said plug and a stepped portion to enable part of a roller caulking an edge of said opening of said housing to revolve and travel along a peripheral edge of said housing so that said plug having said flange is coupled to said housing by caulking an edge of said opening of said housing.

2. A method for manufacturing a rotary damper including:
having a partition wall to partition space formed between a rotor and a housing to house said rotor and to form a fluid chamber to be fluid-filled and a vane to be disposed in said fluid chamber, comprising the step of:
forming said housing integrally with said partition wall by press working;
forming, by press working, a plug having a flange to be used for mounting which extends toward a direction approximately orthogonal to an outer circumferential surface of said housing and a stepped portion to enable part of a roller caulking an edge of said opening of said housing to revolve and travel along a peripheral edge of said housing so that said plug having said flange is coupled to said housing by caulking an edge of said opening of said housing; and caulking an edge of said opening of said housing by making part of said roller revolve and travel along a peripheral edge using said stepped portion of said plug to couple le said plug to said housing.

* * * * *